(12) United States Patent  
Yamagoe

(10) Patent No.: US 9,309,643 B2  
(45) Date of Patent: Apr. 12, 2016

(54) WORK VEHICLE

(71) Applicant: KOMATSU LTD., Tokyo (JP)

(72) Inventor: Yosuke Yamagoe, Komatsu (JP)

(73) Assignee: KOMATSU LTD., Tokyo (JP)

( * ) Notice: Subject to any disclaimer, the term of this patent is extended or adjusted under 35 U.S.C. 154(b) by 3 days.

(21) Appl. No.: 14/363,848

(22) PCT Filed: Mar. 31, 2014

(86) PCT No.: PCT/JP2014/059419  
§ 371 (c)(1),  
(2) Date: Jun. 9, 2014

(87) PCT Pub. No.: WO2014/192403  
PCT Pub. Date: Dec. 4, 2014

(65) Prior Publication Data  
US 2015/0275475 A1 Oct. 1, 2015

(51) Int. Cl.  
B60K 11/00 (2006.01)  
E02F 9/08 (2006.01)  
(Continued)

(52) U.S. Cl.  
CPC ............. *E02F 9/0866* (2013.01); *B60K 11/04* (2013.01); *B60K 11/06* (2013.01); *B60K 11/08* (2013.01); *B60K 13/04* (2013.01); *B62D 25/082* (2013.01); *B62D 25/10* (2013.01); *E02F 9/0891* (2013.01); *F01N 3/02* (2013.01); *F01N 3/28* (2013.01); *F01N 13/08* (2013.01); *F01P 1/06* (2013.01); *B60Y 2200/415* (2013.01); *F01N 3/021* (2013.01); *F01N 3/103* (2013.01); *F01N 2590/08* (2013.01); *F01P 2001/005* (2013.01)

(58) Field of Classification Search  
CPC ........ B60K 11/00; B60K 11/04; B60K 11/08; B60K 13/04; F01N 13/08  
USPC ................. 180/68.1, 68.2, 900, 908  
See application file for complete search history.

(56) References Cited

U.S. PATENT DOCUMENTS 5,709,175 A * 1/1998 Carroll ........................ 123/41.49  
6,123,293 A * 9/2000 Breitbach et al. ............... 244/54  
(Continued)

FOREIGN PATENT DOCUMENTS

CN 102365439 A 2/2012  
JP 11-22463 A 1/1999  
(Continued)

OTHER PUBLICATIONS

The International Search Report for the corresponding international application No. PCT/JP2014/059419, issued on Jun. 17, 2014.  
(Continued)

*Primary Examiner* — John Walters  
*Assistant Examiner* — James Triggs  
(74) *Attorney, Agent, or Firm* — Global IP Counselors, LLP

(57) ABSTRACT

A wheel loader is provided with a top plate, a plate-like member, a diesel particulate filtering device, and a first duct. The top plate has a first outdoor air intake port. The plate-like member is disposed below the first outdoor air intake port. The diesel particulate filtering device is disposed below the plate-like member. A first end part of the first duct is positioned to the rear of the diesel particulate filtering device. A second end part of the first duct is positioned inside the cooling compartment. A connector is disposed in an air flow generated between a gap and the first end part.

21 Claims, 10 Drawing Sheets

(51) Int. Cl.
*B60K 11/04* (2006.01)
*F01N 3/28* (2006.01)
*F01N 3/02* (2006.01)
*F01N 13/08* (2010.01)
*B62D 25/08* (2006.01)
*B62D 25/10* (2006.01)
*F01P 1/06* (2006.01)
*B60K 11/06* (2006.01)
*B60K 13/04* (2006.01)
*B60K 11/08* (2006.01)
*F01N 3/10* (2006.01)
*F01N 3/021* (2006.01)
*F01P 1/00* (2006.01)

(56) References Cited

U.S. PATENT DOCUMENTS 8,418,448 B2 * 4/2013 Kamata et al. .................. 60/322
2009/0272341 A1 * 11/2009 Ito et al. ..................... 123/41.49
2010/0242866 A1 9/2010 Buchmann et al.
2012/0048631 A1 * 3/2012 Shatters et al. .............. 180/68.1

FOREIGN PATENT DOCUMENTS

| JP | 2001-295650 A | 10/2001 |
| JP | 2003-80957 A | 3/2003 |
| JP | 2004-169518 A | 6/2004 |
| JP | 2007-283801 A | 11/2007 |
| JP | 2013-112283 A | 6/2013 |
| JP | 5329009 B1 | 10/2013 |
| JP | 2014-25254 A | 2/2014 |

OTHER PUBLICATIONS

The Written Opinion for the corresponding international application No. PCT/JP2014/059419, issued on Jun. 17, 2014.
Office Action for the corresponding Chinese patent application No. 201480000292.7, issued on Feb. 1, 2016.

* cited by examiner

WORK VEHICLE

CROSS-REFERENCE TO RELATED APPLICATIONS

This application is a U.S. National stage application of International Application No. PCT/JP2014/059419, filed on Mar. 31, 2014.

BACKGROUND

1. Field of the Invention

The present invention relates to a work vehicle.

2. Description of the Related Art

A work vehicle is provided with an engine compartment. An engine is contained inside the engine compartment. Various devices other than the engine are also contained inside the engine compartment. For example, an exhaust gas post-processing device for processing exhaust gas from the engine is contained inside the engine compartment in the work vehicle disclosed in Japanese Patent Laid-open No. 2014-025254.

SUMMARY

The temperature inside the engine compartment rises when the engine or the various devices contained inside the engine compartment generate heat while operating. As a result, members disposed inside the engine compartment are exposed to the hot air inside the engine compartment. Cooling is required for the members that are preferably not subject to high temperatures but are installed inside the engine compartment.

An object of the present invention is to enable cooling for members to be cooled disposed inside the engine compartment.

A work vehicle according to an aspect of the present invention is provided with an engine, an engine compartment, a cooling compartment, a partition wall, a top plate, a plate-like member, a first member, a duct, a cooling fan, and a cooling object member. The engine compartment contains the engine. The cooling compartment is disposed to the rear of the engine compartment. The partition wall partitions the engine compartment from the cooling compartment. The top plate has an outdoor air intake port. The upper plate defines the upper surface of the engine compartment. The plate-like member extends forward from the partition wall. The plate-like member is disposed below the outdoor air intake port. The first member is disposed below the plate-like member inside the engine compartment. The duct has first and second end parts. The first end part is positioned to the rear of the first member inside the engine compartment. The second end part is positioned inside the cooling compartment. The cooling fan is disposed inside the cooling compartment. The cooling fan exhausts air from the cooling compartment to the outside of the cooling compartment. The cooling object member is disposed in an air flow generated between the first end part and a gap between the first member and the plate-like member.

According to this configuration, the second end part of the duct is positioned inside the cooling compartment. The cooling compartment is a space in which negative pressure is produced when the cooling fan is operating. As a result, the duct sucks in air from the first end part and exhausts the air from the second end part. As a result, outdoor air is sucked in from the outdoor air intake port into the engine compartment due to the negative pressure inside the engine compartment. The outdoor air sucked into the engine compartment flows forward along the plate-like member that extends forward from the partition wall. The outdoor air passes over the plate-like member and flows to the rear toward the first end part of the duct. Specifically, the outside air passes through the gap between the plate-like member and the first member and flows toward the first end part. As a result, the cooling object member installed in the air flow is effectively cooled.

The first member preferably has a tubular shape. According to this configuration, the flow rate of the air flow when passing through the gap between a plate-like part and the first member can be increased because the gap between the plate-like member and the tubular shape gradually becomes smaller.

The first member preferably extends in the vehicle width direction.

The work vehicle is preferably further equipped with an exhaust gas post-processing device. The exhaust gas post-processing device processes exhaust gas from the engine. The first member is a member that configures the exhaust gas post-processing device.

The first end part preferably opens toward the first member. According to this configuration, the above-mentioned air flow can be generated more effectively.

The second end part of the duct preferably opens downwards. According to this configuration, even if rainwater enters the cooling compartment, the rainwater can be prevented from entering the duct. As a result, rainwater can be prevented from entering the engine compartment via the duct.

The first member preferably is a diesel particulate filtering device.

The first member is preferably a diesel oxidation catalyst.

A center position of the first end part in the vertical direction is preferably positioned higher than a center axis of the first member. According to this configuration, the above-mentioned air flow can be generated more effectively.

The top plate preferably has a first sloping part the slopes downward toward the rear. The outdoor air intake port is formed in the first sloping part.

The plate-like member preferably slopes toward the rear and downward. According to this configuration, the air flow can be generated more suitably.

According to exemplary embodiments of the present invention, cooling is made possible for the cooling object member disposed inside the engine compartment.

DETAILED DESCRIPTION OF EXEMPLARY EMBODIMENTS

Figure 1:
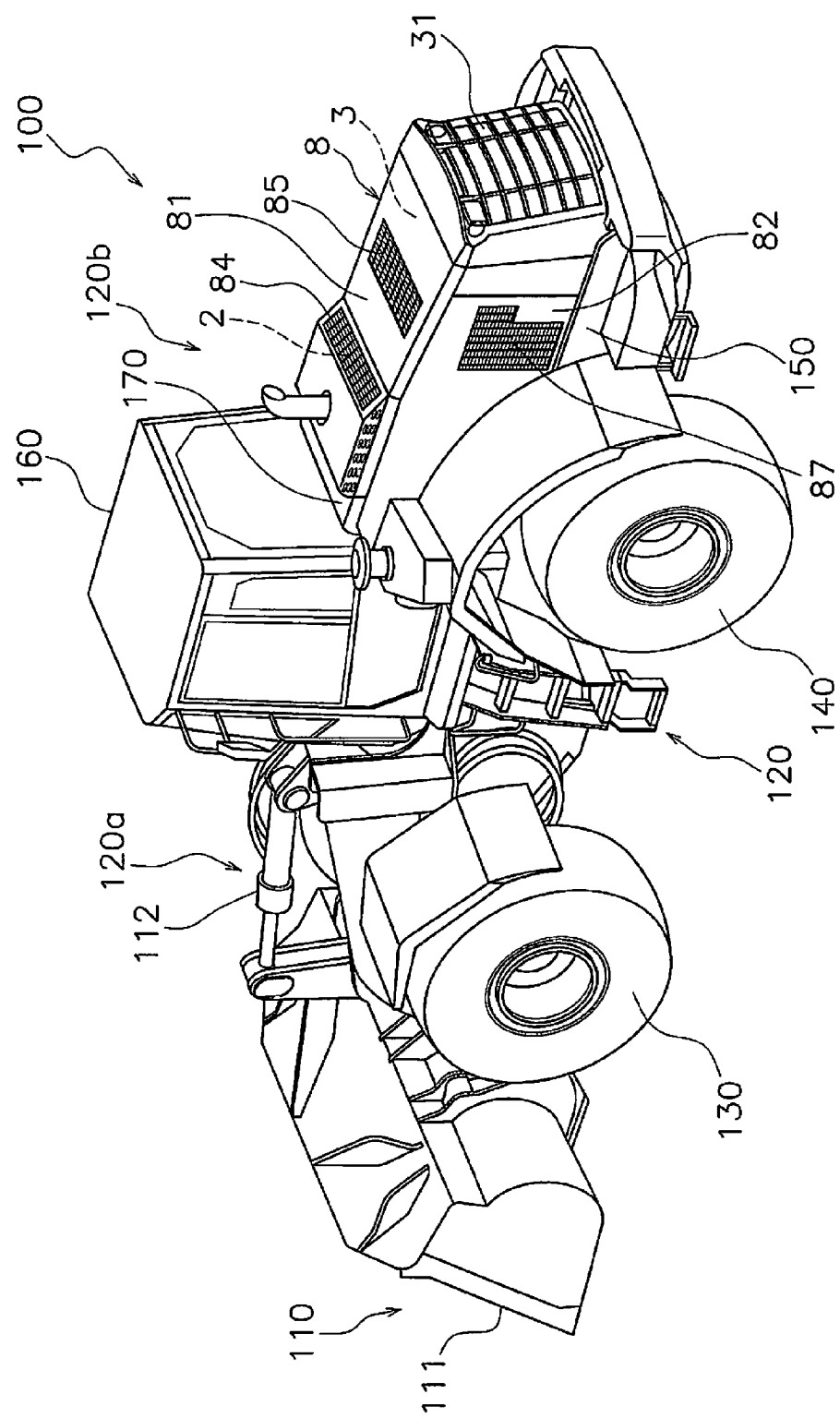
FIG. 1 is a perspective view of a wheel loader.

An exemplary embodiment of a wheel loader as an example of a work vehicle according to exemplary embodiments of the present invention will be explained below with reference to the drawings. FIG. 1 is a perspective external view of a wheel loader 100 as seen from the left rear. In the following description, "right," "left," "up," and "down" indicate directions relative to a state of looking forward from the driver's seat. "Vehicle width direction" and "crosswise direction" have the same meaning. Moreover, the front-back direction signifies the front-back direction of the vehicle body.

As illustrated in FIG. 1, a wheel loader 100 includes a work implement 110, a vehicle body 120, front wheels 130, and rear wheels 140. The wheel loader 100 is capable of traveling due to the rotation of the front wheels 130 and the rear wheels 140, and desired work can be conducted using the work implement 110.

The work implement 110 is a mechanism driven by operating fluid pressurized by a hydraulic pump, and is disposed forward of the vehicle body 120. The work implement 110 includes a bucket 111, a boom (not shown), a lift cylinder (not shown), and a bucket cylinder 112. The bucket 111 is attached to the tip of the boom. The boom is a member for lifting the bucket 111 and is mounted at the front part of a below-mentioned front vehicle part 120a. The lift cylinder drives the boom with pressure oil discharged from a work implement pump. The bucket cylinder 112 drives the bucket 111 with pressure oil discharged from the work implement pump.

The vehicle body 120 has the front vehicle part 120a and a rear vehicle part 120b. The front vehicle part 120a and the rear vehicle part 120b are connected to allow swinging relative to each other in the left-right direction. The work implement 110 and the front wheels 130 are provided on the front vehicle part 120a, and the rear wheels 140 are provided on the rear vehicle part 120b.

Figure 2:
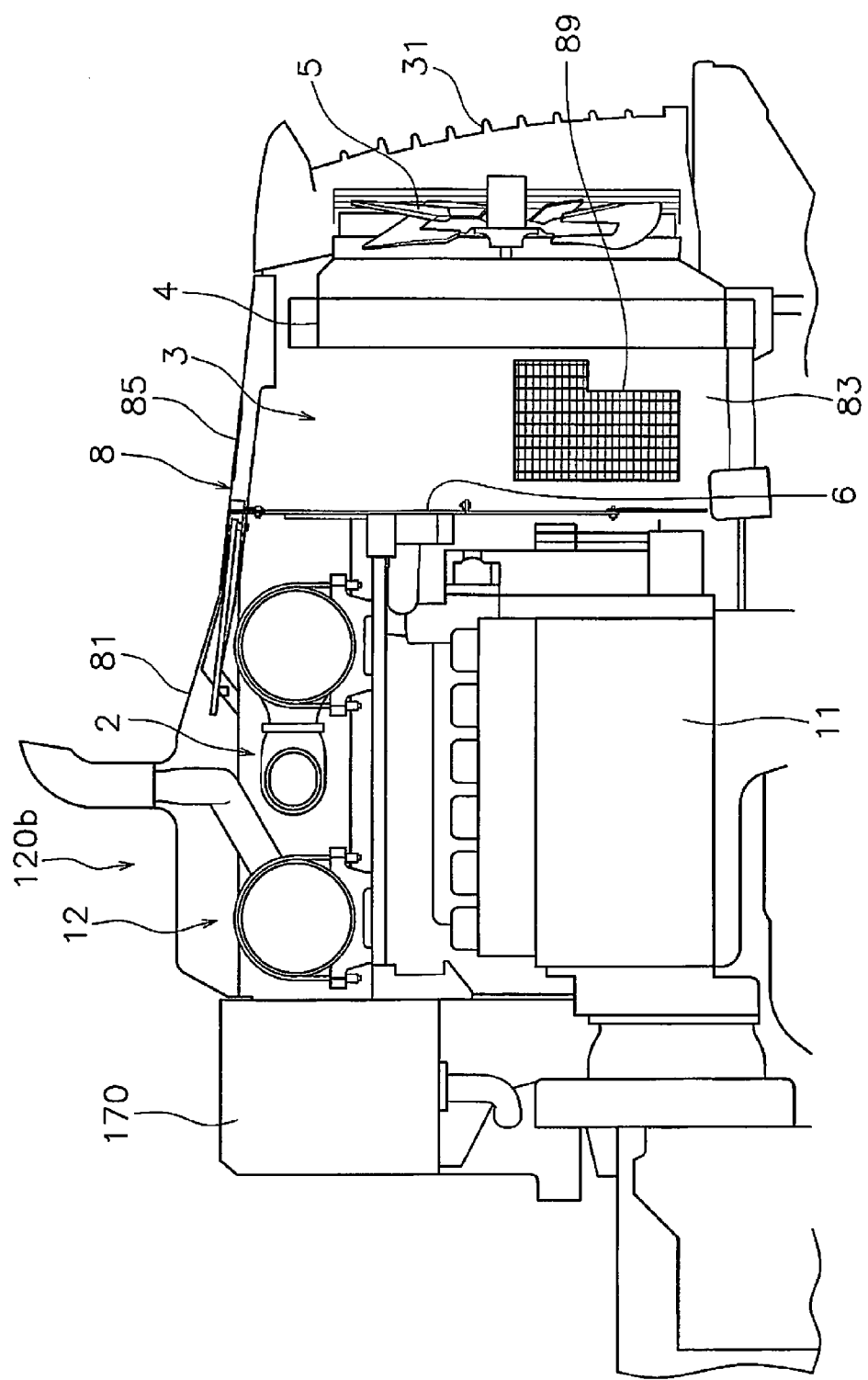
FIG. 2 is a side cross-sectional view of a rear vehicle part.

The rear vehicle part 120b has a vehicle frame 150, a cab 160, a hydraulic fluid tank 170, an engine compartment 2, a cooling compartment 3, and a cooling fan 5 (see FIG. 2). The vehicle frame 150 is a frame that mainly configures the rear vehicle part 120b and supports the rear wheels 140, the cab 160, the hydraulic fluid tank 170, an engine 11 and the like.

An operating cabin is provided inside the cab 160, and various operating members and an operating panel are provided inside the cab 160. The operating fluid tank 170 is disposed to the rear of the cab 160, and a plurality of hydraulic pumps (not shown) are disposed below the operating fluid tank 170. Operating fluid for driving the work implement 110 and the like is stored in the operating fluid tank 170, and the operating fluid is supplied to the work implement 110 and the like by the hydraulic pumps.

FIG. 2 is a side cross-section of the rear vehicle body 120b as seen from the left. As illustrated in FIG. 2, the engine compartment 2 is disposed to the rear of the hydraulic fluid tank 170 and is defined by a vehicle body cover 8.

As illustrated in FIG. 1, the vehicle body cover 8 has a top plate 81, a first side plate 82, and a second side plate 83 (see FIG. 2). The upper plate 81 defines the upper surface of the engine compartment 2. The first and second side plates 82 and 83 define the side surfaces of the engine compartment 2. Specifically, the first side plate 82 defines the left side surface of the engine compartment 2, and the second side plate 83 defines the right side surface of the engine compartment 2.

As illustrated in FIG. 2, the engine 11 and an exhaust gas post-processing device 12 and the like are contained inside the engine compartment 2. The engine 11 is disposed in a lower part of the engine compartment 2 and a crankshaft thereof extends in the front-back direction, that is, the engine 11 is a so-called vertical mounted engine.

Figure 3:
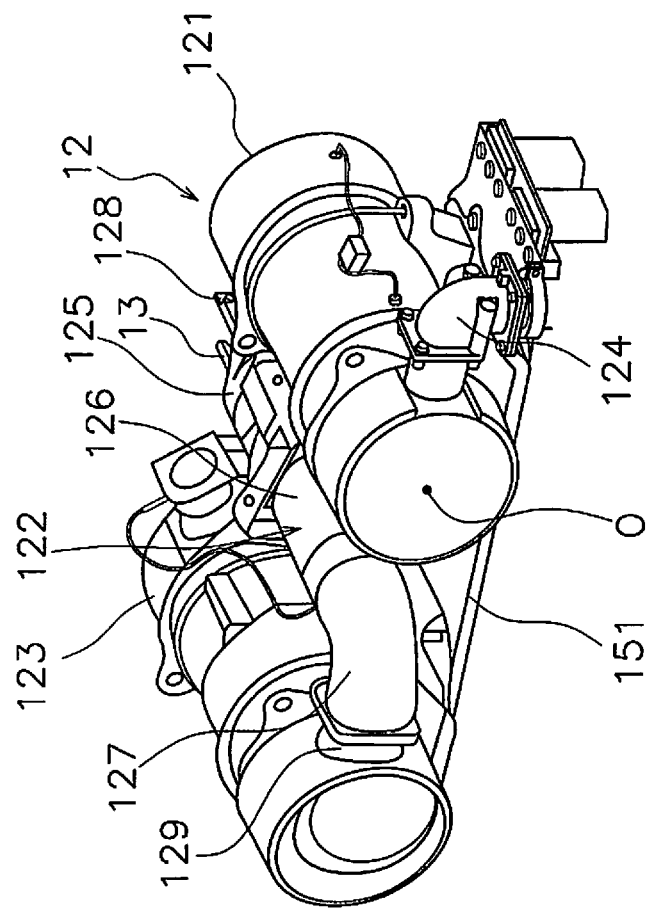
FIG. 3 is a perspective view of an exhaust gas post-processing device.

The exhaust gas post-processing device 12 is disposed in an upper part of the engine compartment 2. Specifically, the exhaust gas post-processing device 12 is disposed above the engine 11. FIG. 3 is a perspective view of the exhaust gas post-processing device 12 as seen from the left rear. As illustrated in FIG. 3, the exhaust gas post-processing device 12 includes, in order of the flow of exhaust gas, a diesel particulate filtering device 121, a connecting pipe 122, and a selective catalyst reduction device 123. A urea water injection device 13 is attached to the connecting pipe 122. The diesel particulate filtering device 121 corresponds to an example of the first member of the present invention.

The diesel particulate filtering device 121 has a tubular shape and extends in the vehicle width direction. Specifically, a center axis O of the diesel particulate filtering device 121 extends in the vehicle width direction. The diesel particulate filtering device 121 is connected to the engine 11 through a pipe 124. The diesel particulate filtering device 121 is a device for processing exhaust gas exhausted from the engine 11.

Specifically, the diesel particulate filtering device 121 is a device that collects, in a filter, particulate matter, such as soot, in the exhaust gas emitted from the engine 11. The diesel particulate filtering device 121 burns the collected particulate matter with a heater provided with the filter. The diesel particulate filtering device 121 is supported by a supporting member 151 attached to the vehicle frame 150.

The connecting pipe 122 is a pipe for connecting the diesel particulate filtering device 121 and the selective catalyst reduction device 123. The entire connecting pipe 122 is formed in an S shape and includes a first bend part 125, a linear part 126, and a second bend part 127. The first bend part 125 is connected to an exhaust gas outlet port 128 of the diesel particulate filtering device 121. The second bend part 127 is connected to an exhaust gas inlet port 129 of the selective catalyst reduction device 123. The linear part 126 extends between the first bend part 125 and the second bend part 127.

The urea water injection device 13 is attached to the first bend part 125. The urea water injection device 13 injects a urea water aqueous solution into the connecting pipe 122. The urea water aqueous solution is sucked up from a urea water aqueous solution tank (not shown) by a pump (not shown) and is supplied to the urea water injection device 13 via a pipe (not shown). The urea water aqueous solution injected into the connecting pipe 122 undergoes hydrolysis due to the heat from the exhaust gas and becomes ammonia. The ammonia is fed with the exhaust gas through the connecting pipe 122 to the selective catalyst reduction device 123.

The above-mentioned ammonia is used as a reducing agent to purify by reduction the nitrogen oxides in the exhaust gas in the selective catalyst reduction device 123. The selective catalyst reduction device 123 is supported by the supporting member 151 in the same way as the diesel particulate filtering device 121.

The diesel particulate filtering device 121 and the selective catalyst reduction device 123 are disposed parallel to each other. Specifically, the diesel particulate filtering device 121 and the selective catalyst reduction device 123 both have substantially tubular shapes. The center axes of the diesel particulate filtering device 121 and the selective catalyst reduction device 123 are both disposed to extend substantially parallel to each other in the vehicle width direction. The linear part 126 in the connecting pipe 122 also has a substantially tubular shape and the center axis thereof extends in the vehicle width direction. Specifically, the center axis of the linear part 126 of the connecting pipe 122 is disposed substantially parallel to the center axes of the diesel particulate filtering device 121 and the selective catalyst reduction device 123.

The cooling compartment 3 is disposed to the rear of the engine compartment 2 as illustrated in FIG. 2. The engine compartment 2 and the cooling compartment 3 are partitioned by a partition wall 6. The cooling compartment 3 is defined by the vehicle body cover 8 in the same way as the engine compartment 2. Specifically, the upper surface of the cooling compartment 3 is defined by the top plate 81 and the sides of the cooling compartment 3 are defined by the first and second side plates 82 and 83.

Specifically, a front part of the top plate 81 defines the upper surface of the engine compartment 2, and a rear part of the top plate 81 defines the upper surface of the cooling compartment 3. The front parts of the first and second side plates 82 and 83 define the side surfaces of the engine compartment 2, and the rear parts of the first and second side plates 82 and 83 define the side surfaces of the cooling compartment 3.

A radiator 4 and the cooling fan 5 are contained inside the cooling compartment 3. The radiator 4 cools cooling liquid for the engine 11. The cooling fan 5 rotates to exhaust air inside the cooling compartment 3 to the outside of the cooling compartment 3. Specifically, the cooling fan 5 rotates to exhaust air from inside the cooling compartment 3 to the outside of the cooling compartment 3 via a grille 31. That is, the cooling fan 5 generates an air flow toward the rear. The cooling fan 5 is disposed to the rear of the radiator 4. The grille 31 defines the rear surface of the cooling compartment 3.

Figure 4:
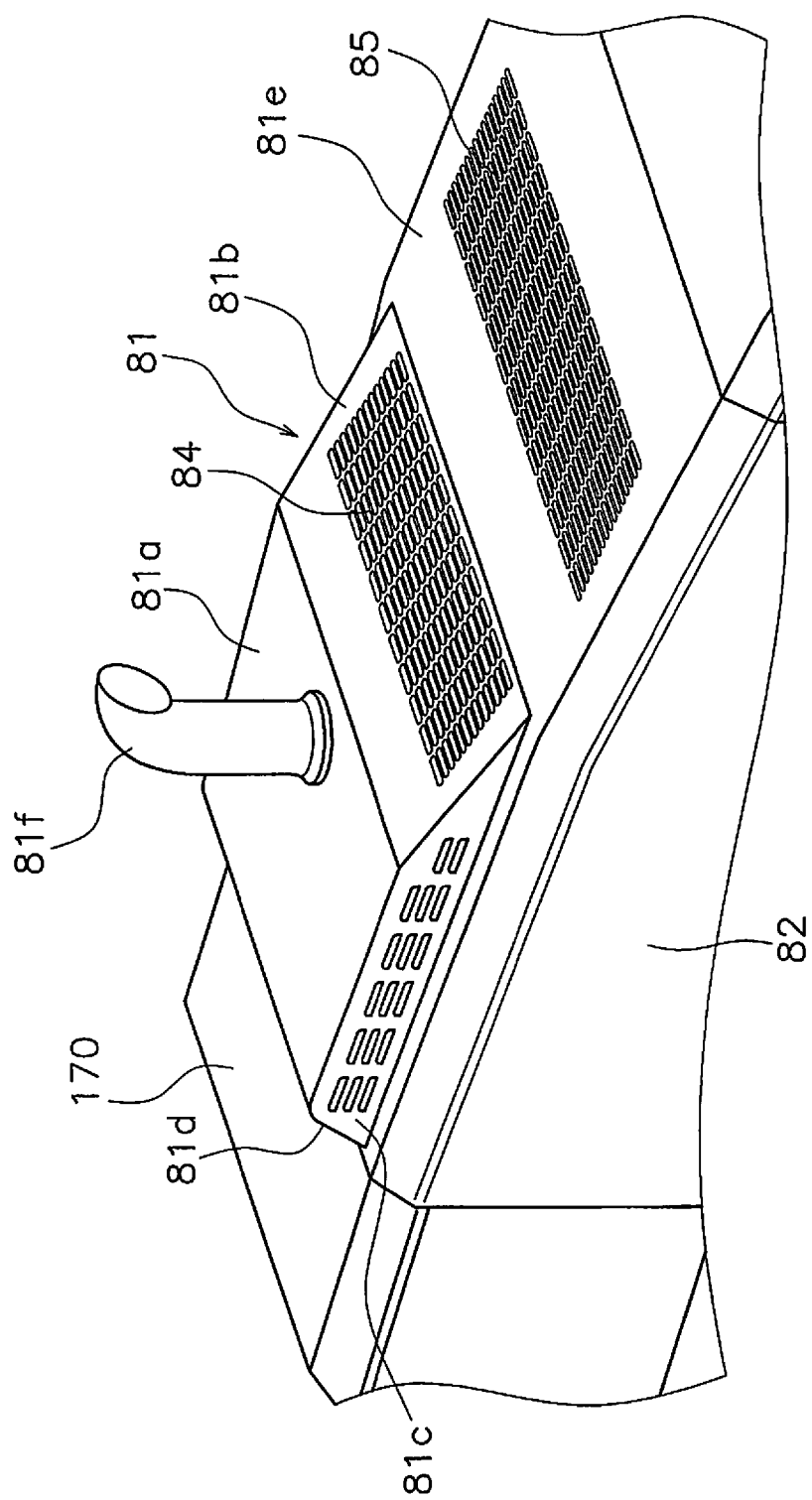
FIG. 4 is a perspective view of a top plate.

FIG. 4 is a perspective view of the top plate 81 as seen from the left rear side. As illustrated in FIG. 4, the top plate 81 is supported in a detachable manner on the vehicle frame 150. While not limited in particular, the top plate 81 is attached to the vehicle frame 150 by a fastening member, such as a bolt. Specifically, the front part of the top plate 81 defines the upper surface of the engine compartment 2, and the rear part of the top plate 81 defines the upper surface of the cooling compartment 3 when the top plate 81 is attached to the vehicle frame 150.

The top plate 81 has a first outdoor air intake port 84 that allows communication between the engine compartment 2 and the outside. The first outdoor air intake port 84 is configured by a plurality of through-holes. The first outdoor air intake port 84 is formed in the front part of the top plate 81 and outside air is sucked into the engine compartment 2 through the first outdoor air intake port 84. The through-holes that configure the first outdoor air intake port 84 are shaped as slits that extend in the vehicle width direction. The first outdoor air intake port 84 corresponds to the outdoor air intake port of the present invention.

The top plate 81 further has a second outdoor air intake port 85 that allows communication between the cooling compartment 3 and the outside. The second outdoor air intake port 85 is configured by a plurality of through-holes. The second outdoor air intake port 85 is formed in the rear part of the top plate 81 and outdoor air is sucked into the cooling compartment 3 through the second outdoor air intake port 85.

The second outdoor air intake port 85 is positioned in front of the radiator 4 and the cooling fan 5 in the front-back direction. The second outdoor air intake port 85 is positioned on the upper surface of the cooling compartment 3 and allows communication between the cooling compartment 3 and the outside. The front end of the second outdoor air intake port 85 is positioned to the rear of the partition wall 6 in the front-back direction, and the rear end of the second outdoor air intake port 85 is positioned in front of the radiator 4 in the front-back direction. The second outdoor air intake port 85 is configured by a plurality of through-holes. The second outdoor air intake port 85 has a substantially rectangular shape as seen in a plan view.

The top plate 81 has a flat part 81a, a first sloping part 81b, a pair of side wall parts 81c, a front wall part 81d, and a second sloping part 81e.

The flat part 81a has a rectangular shape and extends substantially in the horizontal direction. An exhaust pipe 81f extends upward from the flat part 81a. The exhaust pipe 81f is a pipe for exhausting to the outside the exhaust gas that has been processed by the exhaust gas post-processing device 12. The front wall part 81d extends downward from the front end of the flat part 81a. The side wall parts 81c extend downward from the side ends of the flat part 81a.

The first sloping part 81b extends to the rear from the rear end of the flat part 81a. The first sloping part 81b slopes downward toward the rear. The first sloping part 81b has the same width as the flat part 81a. The above-mentioned first outdoor air intake port 84 is formed in the first sloping part 81b.

The second sloping part 81e extends to the rear from the rear end of the first sloping part 81b. The second sloping part 81e slopes downward toward the rear. The slope of the second sloping part 81e is gentler than the slope of the first sloping part 81b. The second sloping part 81e mainly defines the upper surface of the cooling compartment 3, and partially defines the rear part upper surface of the engine compartment 2. The above-mentioned second outdoor air intake port 85 is formed in the second sloping part 81e.

Figure 5:
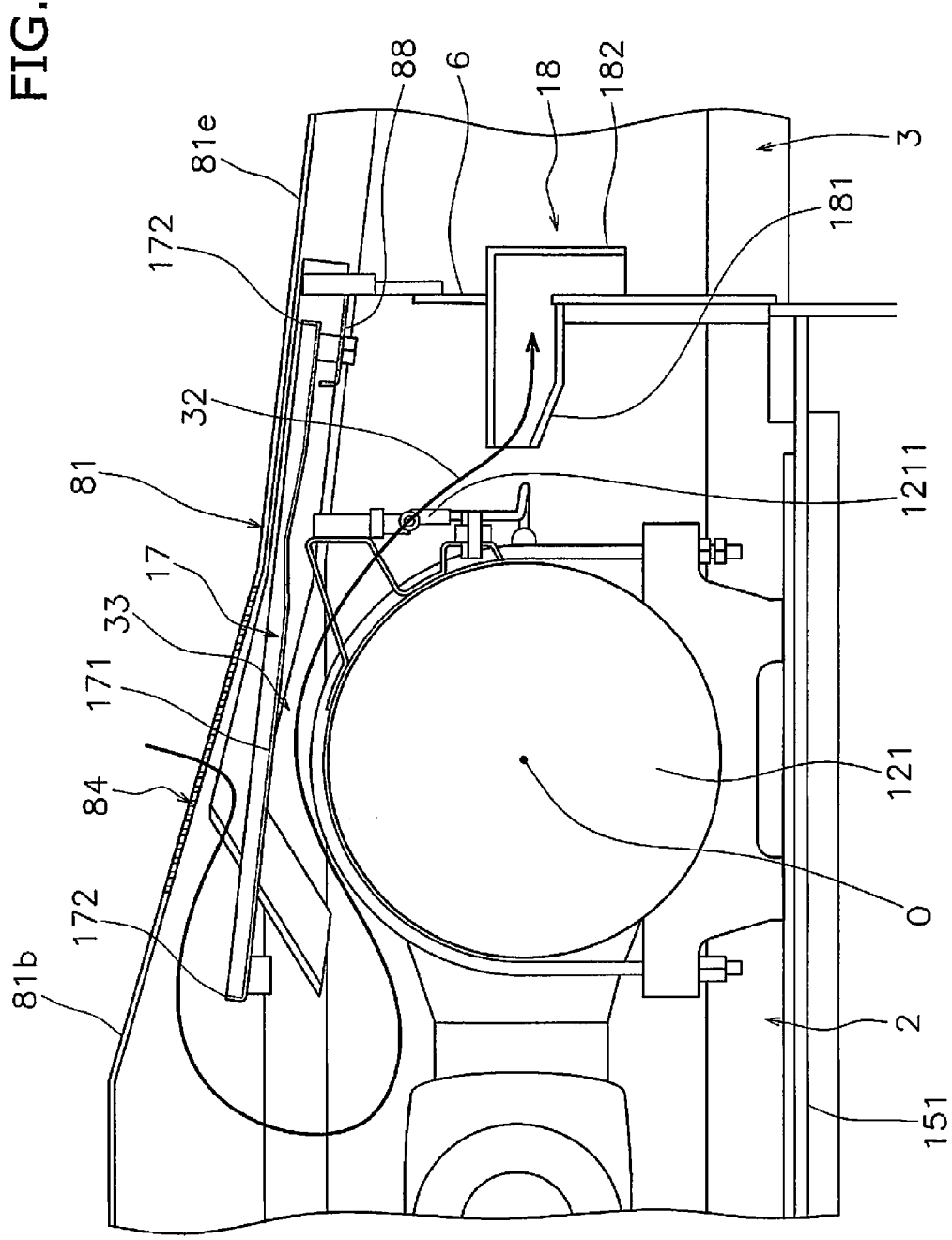
FIG. 5 is side cross-sectional view of a rear vehicle part.

FIG. 5 is a side cross-section of the rear vehicle body 120b. As illustrated in FIG. 5, a plate-like member 17 is disposed below the top plate 81. Specifically, the plate-like member 17 is disposed below the first outdoor air intake port 84. The plate-like member 17 extends forward from the partition wall 6. The plate-like member 17 is disposed so that a gap is formed between the plate-like member 17 and the partition wall 6 in the front-back direction. A below-mentioned beam member 88 is installed to cover the gap. The beam member 88 is disposed below the plate-like member 17 and the rear end of the beam member 88 is in contact with the partition wall 6.

The plate-like member 17 is positioned above the diesel particulate filtering device 121 with a gap 33. The plate-like member 17 slopes downward toward the rear. The slope of the plate-like member 17 is gentler than the slope of the first sloping part 81b. The slope of the plate-like member 17 slopes at substantially the same angle as the slope of the second sloping part 81e.

The gap 33 between the plate-like member 17 and the diesel particulate filtering device 121 in front of the center axis O of the diesel particulate filtering device 121 gradually becomes narrower towards the rear. The above-mentioned gap 33 to the rear of the center axis O of the diesel particulate filtering device 121 gradually becomes wider toward the rear.

The plate-like member 17 is disposed to cover all of the first outdoor air intake port 84 in the bottom view. Specifically, the length of the plate-like member 17 in the vehicle width direction is the same as the length of the first outdoor air intake port 84 or is greater than the length of the first outdoor air intake port 84. Moreover, the length of the plate-like member 17 in the front-back direction is the same as the length of the first outdoor air intake port 84 or is greater than the length of the first outdoor air intake port 84.

The plate-like member 17 has a tray-like shape. Specifically, the plate-like member has a bottom plate 171 and a side plate 172. The bottom plate 171 has a substantially rectangular shape. The side plate 172 extends upward from an outer edge of the bottom plate 171.

As illustrated in FIG. 5, the wheel loader 100 is further provided with a first duct 18. The first duct 18 has a first end part 181 and a second end part 182. The first end part 181 is positioned inside the engine compartment 2 and the second end part 182 is positioned inside the cooling compartment 3. Specifically, the first duct 18 passes through the partition wall 6 and extends to cross between the engine compartment 2 and the cooling compartment 3. The first duct 18 corresponds to the duct in the present invention.

The first end part 181 of the first duct 18 is positioned to the rear of the diesel particulate filtering device 121 inside the engine compartment 2. Specifically, the first end part 181 is positioned between the diesel particulate filtering device 121 and the partition wall 6 in the front-back direction. Moreover, the first end part 181 is positioned substantially in the middle in the vehicle width direction. The center of the first end part 181 is above the center axis O of the diesel particulate filtering device 121 in the vertical direction.

The second end part 182 of the first duct 18 is positioned inside the cooling compartment 3. Specifically, the second end part 182 of the first duct 18 is positioned in front of the cooling fan 5 inside the cooling compartment 3. The second end part 812 of the first duct 18 opens downward. Specifically, the first duct 18 is formed in an L shape and the first end part 181 opens toward the front and the second end part opens downward.

When the cooling fan 5 is operating, the first end part 181 of the first duct 18 sucks in the air inside the engine compartment 2. As a result, an air flow is generated as depicted by the arrow 32 in FIG. 5. Specifically, the outdoor air sucked into the engine compartment 2 from the first outdoor air intake port 84 flows forward along the plate-like member 17. The outdoor air that passes over the front end of the plate-like member 17 passes through the gap 33 between the plate-like member 17 and the diesel particulate filtering device 121 and flows toward the first end part 181 of the first duct 18. A connector 1211 is disposed in an air flow 32 that is generated between the gap 33 and the first end part 181. The distance between the diesel particulate filtering device 121 and the plate-like member 17 that is the narrowest portion of the gap 33 is preferably approximately 30 mm to 50 mm, and more preferably approximately 35 mm to 40 mm. The connector 1211 is a connector for signal wiring. The connector 1211 is a component that preferably does not become heated. The distance between the diesel particulate filtering device 121 and the connector 1211 is preferably approximately 70 mm to 100 mm, and more preferably approximately 80 mm to 85 mm.

Figure 6:
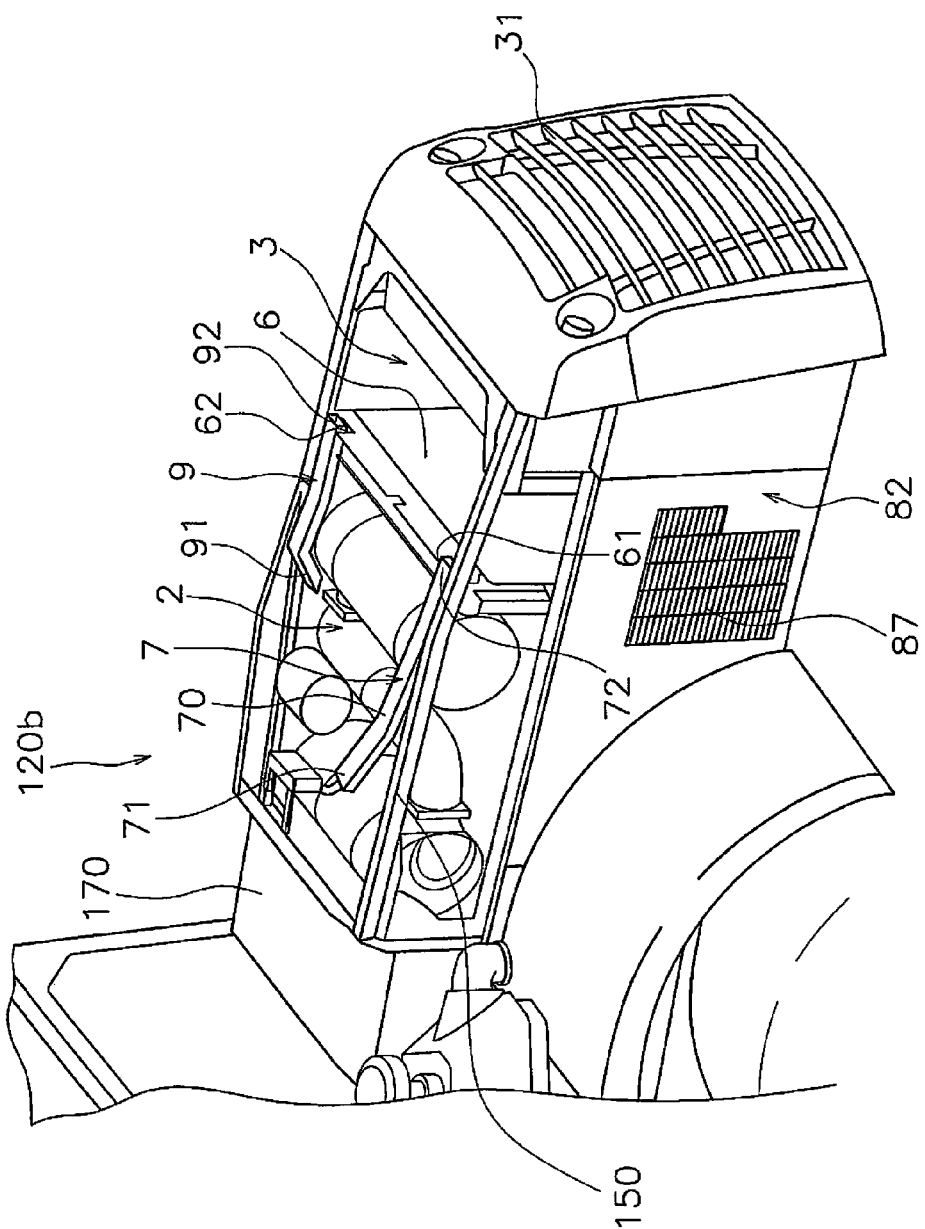
FIG. 6 is a perspective view of the rear vehicle part.

FIG. 6 is a perspective view of the rear vehicle part 120*b* when the top plate 81 is detached. As illustrated in FIG. 6, a third outdoor air intake port 87 is formed in the first side plate 82 that is a portion of the vehicle body cover 8. The third outdoor air intake port 87 is an opening part for sucking in outdoor air into the cooling compartment 3. The cooling compartment 3 communicates with the outside through the third outdoor air intake port 87.

The third outdoor air intake port 87 is positioned in front of the radiator 4 and the cooling fan 5 in the front-back direction. Specifically, at least a portion of the third outdoor air intake port 87 is positioned in front of the radiator 4. The third outdoor air intake port 87 is positioned on the left side surface (example of the first side surface) of the cooling compartment 3 and allows communication between the cooling compartment 3 and the outside. The third outdoor air intake port 87 is configured by a plurality of through-holes. A fourth outdoor air intake port 89 (see FIG. 2) is formed in the second side plate 83 that defines the right side surface (example of the second side surface) of the cooling compartment 3. A detailed explanation of the fourth outdoor air intake port 89 is omitted because the configuration thereof is the same as that of the third outdoor air intake port 87.

As illustrated in FIG. 6, the wheel loader 100 is further provided with second and third ducts 7 and 9. The second and third ducts 7 and 9 extend to cross between the engine compartment 2 and the cooling compartment 3. Specifically, the second and third ducts 7 and 9 extend while passing through the partition wall 6.

Figure 9:
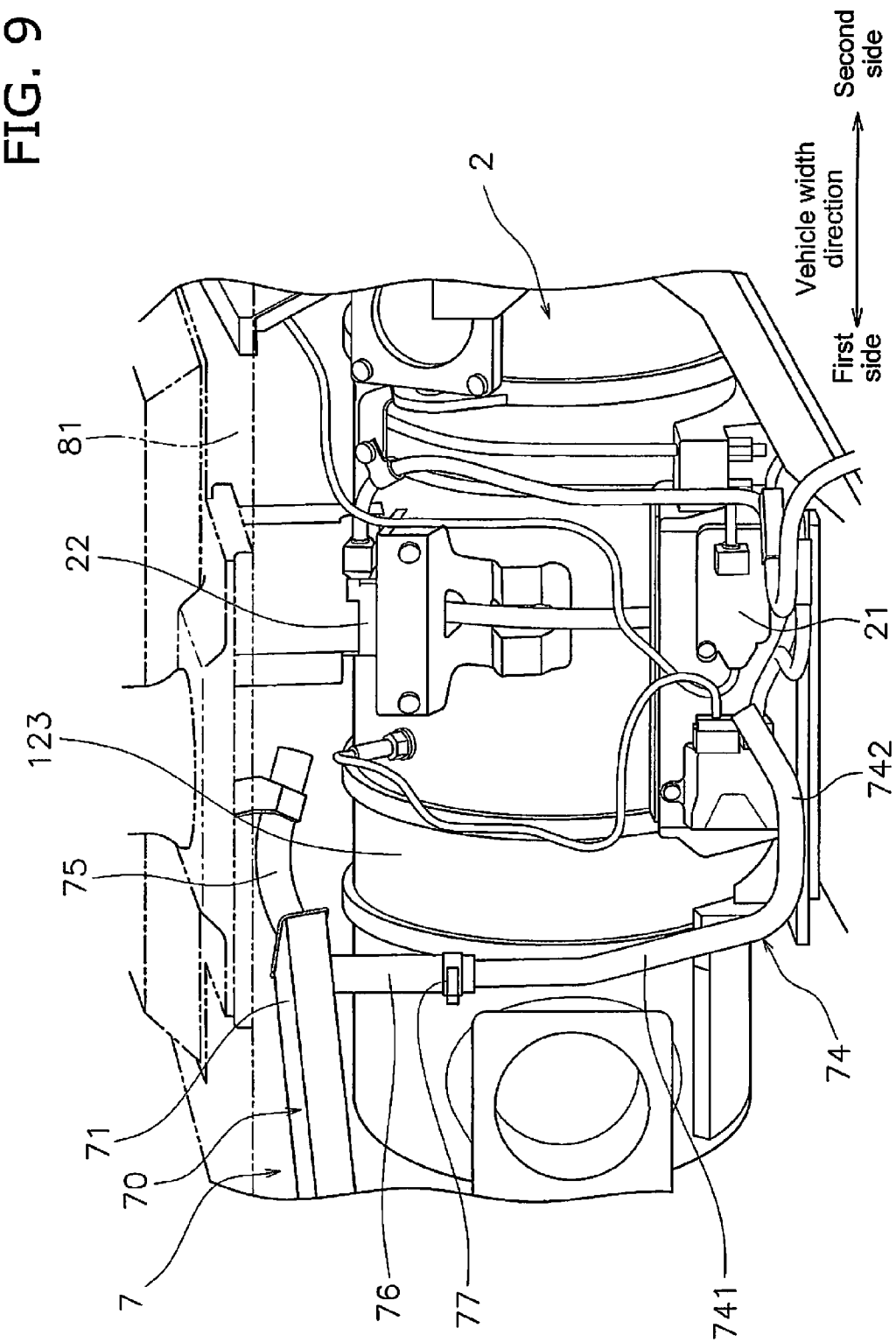
FIG. 9 is a perspective view of the inside of an engine compartment.

The second duct 7 has a second duct body part 70, a first intake part 74 (see FIG. 9), and second intake part 75 (see FIG. 9). The second duct body part 70 has third and fourth end parts 71 and 72. The third end part 71 of the second duct body part 70 is positioned inside the engine compartment 2. The fourth end part 72 of the second duct body part 70 is positioned inside the cooling compartment 3. The fourth end part 72 is positioned in front of the radiator 4 and the cooling fan 5 in the front-back direction. Specifically, the fourth end part 72 is positioned near the partition wall 6.

Figure 7:
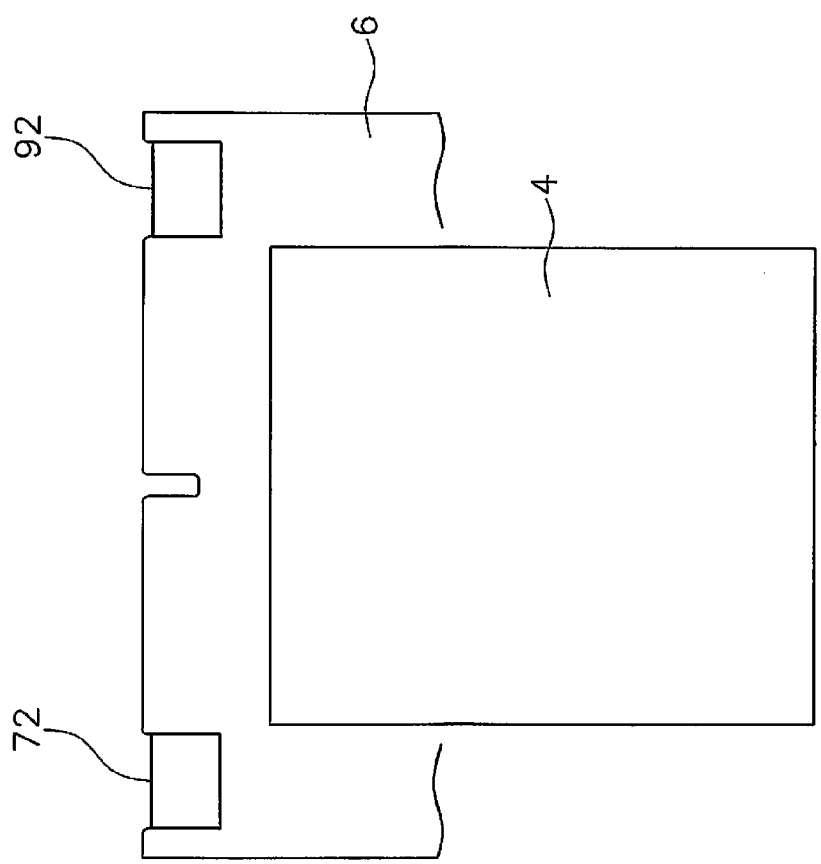
FIG. 7 is a schematic view of a positional relationship between end parts and a radiator.

As illustrated in FIG. 7, the fourth end part 72 is disposed in a position that does not face the radiator 4 in a back view. Specifically, the fourth end part 72 is positioned in an upper end part and a left side end part (example of the first side end part) inside the cooling compartment 3. That is, the fourth end part 72 is positioned near the second outdoor air intake port 85 and the third outdoor air intake port 87. FIG. 7 is a schematic view depicting a positional relationship between the radiator 4 and the ducts in the back surface.

Figure 8:
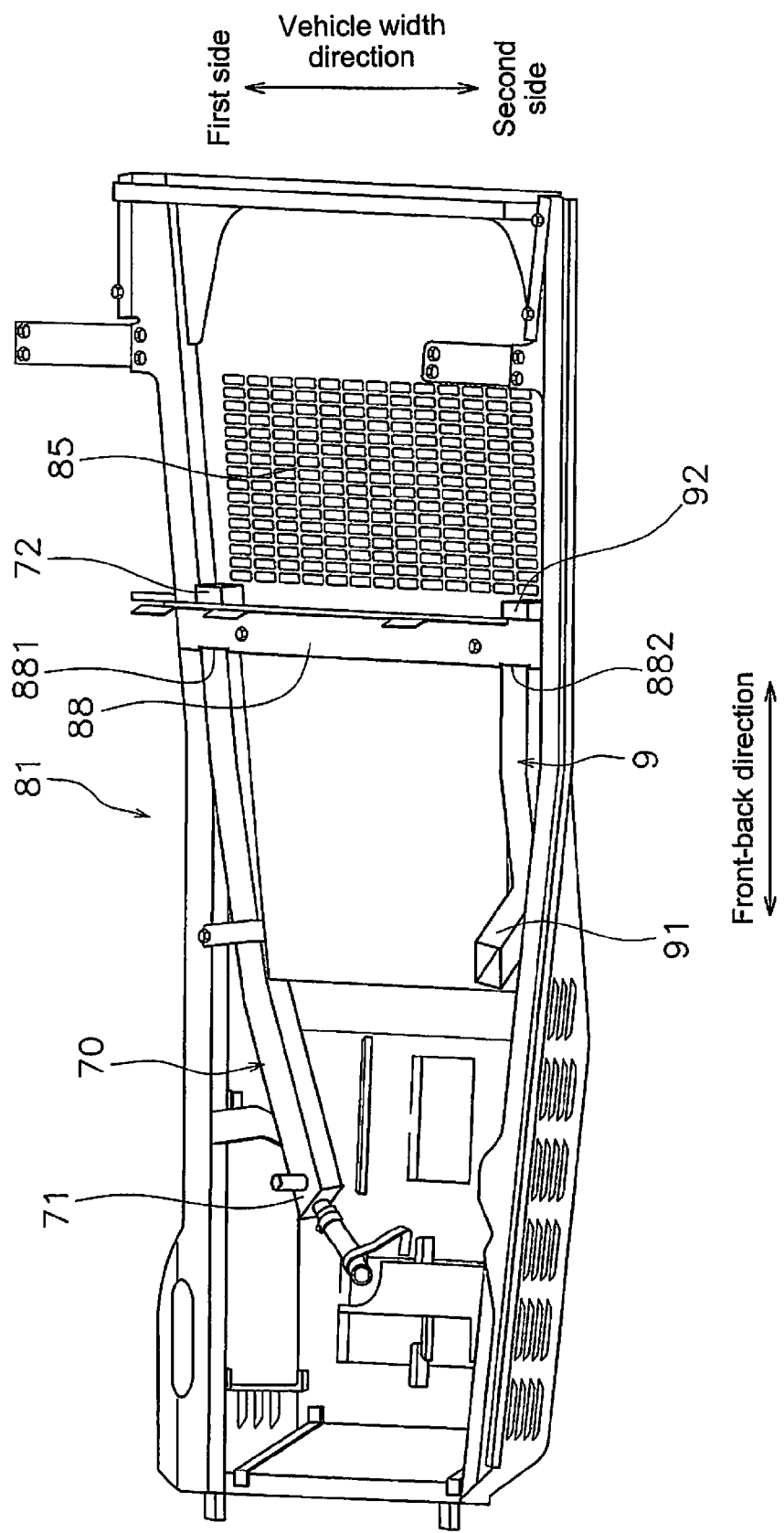
FIG. 8 is a perspective view of the top plate as seen from the underside.

FIG. 8 is a perspective view of the underside of the top plate 81. As illustrated in FIG. 8, the second duct body part 70 is attached to the top plate 81. Specifically, the second duct body part 70 is attached to the top plate 81 by a fixing means, such as a mounting bracket or by welding and the like. The second duct body part 70 can be integrally detached with the top plate 81 by detaching the top plate 81 from the vehicle frame 150.

Specifically, the rear end part of the second duct body part 70 is supported by the beam member 88. The beam member 88 is fixed to a below mentioned top plate body part 811. The beam member 88 extends in the vehicle width direction, and more specifically, extends from the left side end part (example of the first side end part) to the right side end part (example of the second side end part) of the top plate body part 811.

The beam member 88 has first and second through-holes 881 and 882 that extend in the front-back direction. The first through-hole 881 is formed in the left side end part and the second through-hole 882 is formed in the right side end part. The second duct body part 70 is supported on the beam member 88 by passing through the first through-hole 881. A portion of the left side surface of the second duct body part 70 is welded to the inside surface of the top plate 81.

The second duct body part 70 is disposed in the left side end part (example of the first side end part) inside the engine compartment 2. The cross-section of the second duct body part 70 vertical to the longitudinal direction has a rectangular shape. The second duct body part 70 extends substantially in the front-back direction. The second duct body part 70 approaches the middle in the vehicle width direction as the second duct body part 70 advances to the front.

FIG. 9 is a perspective view of the inside of the engine compartment as seen from the rear. As illustrated in FIG. 9, the first intake part 74 and the second intake part 75 are connected to the third end part 71 of the second duct body part 70.

The first intake part 74 extends from the third end part 71 of the second duct body part 70 toward a NOx sensor 21. Specifically, the first intake part 74 is disposed to suck in the air around the NOx sensor 21. The NOx sensor 21 is disposed inside the engine compartment 2. The NOx sensor 21 measures the NOx concentration inside the selective catalyst reduction device 123.

The first intake part 74 is detachably attached to the third end part 71 of the second duct body part 70. Specifically, the first intake part 74 is attached to the third end part 71 of the second duct body part 70 via a flexible pipe 76. The pipe 76 can be detached from the first intake part 74 by detaching a band member 77. The first intake part 74 is fixed in the inside of the engine compartment 2 with a mounting bracket and the like.

The first intake part 74 is substantially shaped as an L. Specifically, the first intake part 74 has a first part 741 that extends downward and a second part 742 that extends in the vehicle width direction. The first part 741 extends downward from the third end part 71 of the second duct body part 70. The second part 742 extends from the lower end part of the first part 741 to the right side (example of the second side). Air around the NOx sensor 21 is sucked in from the distal end part of the second part 742.

The second intake part 75 extends from the third end part 71 of the second duct body part 70 toward a temperature sensor 22. Specifically, the second intake part 75 is disposed to suck in the air around the temperature sensor 22. The second intake part 75 extends from the third end part 71 of the second duct body part 70 to the right side (example of the second side). The second intake part 75 is fixed to the top plate 81 with a mounting bracket and the like. As a result, the second intake part 75 is detached integrally with the top plate 81.

The temperature sensor 22 is disposed inside the engine compartment 2. The temperature sensor 22 measures the temperature of the selective catalyst reduction device 123. The flow passage area in the second duct body part 70 is larger than the flow passage area of the first intake part 74 and larger than the flow passage area of the second intake part 75.

As illustrated in FIG. 6, the third duct 9 has fifth and sixth end parts 91 and 92. The fifth end part 91 is positioned inside the engine compartment 2. The sixth end part 92 is positioned inside the cooling compartment 3. The sixth end part 92 is positioned in front of the radiator 4 and the cooling fan 5 in the front-back direction.

When the cooling fan 5 is operating, the fifth end part 91 of the third duct 9 sucks in the air inside the engine compartment 2. The fifth end part 91 opens toward the urea water injection device 13. The fifth end part 91 of the third duct 9 is positioned near the urea water injection device 13. While not limited in particular, the distance between the fifth end part 91 and the urea water injection device 13 is approximately 200 mm to 250 mm, or preferably approximately 210 mm to 220 mm. Moreover, when the cooling fan 5 is operating, the sixth end part 92 exhausts the sucked in air from the fifth end part 91 inside the cooling compartment 3.

As illustrated in FIG. 7, the sixth end part 92 is disposed in a position that does not face the radiator 4 in the back view. Specifically, the sixth end part 92 is positioned in an upper end part and a right side end part (example of the second side end part) inside the cooling compartment 3. That is, the sixth end part 92 is positioned near the second outdoor air intake port 85 and the fourth outdoor air intake port 89.

As illustrated in FIG. 8, the third duct 9 is attached to the top plate 81. Specifically, the third duct 9 is attached to the top plate 81 by a fixing means, such as a mounting bracket or by welding and the like. The third duct 9 can be integrally detached with the top plate 81 by detaching the top plate 81 from the vehicle frame 150.

Specifically, the rear end part of the third duct 9 is supported by the beam member 88. The third duct 9 is supported on the beam member 88 by passing through the second through-hole 882. A portion of the right side surface of the third duct 9 is welded to the inside surface of the top plate 81.

The third duct 9 is disposed in the right side end part (example of the second side end part) inside the engine compartment 2. The cross-section of the third duct 9 vertical to the longitudinal direction has a rectangular shape. The third duct 9 extends substantially in the front-back direction. The fifth end part 91 of the third duct 9 opens toward the urea water injection device 13. Specifically, the third duct 9 mainly extends along the top plate 81 and a portion at the fifth end part 91 side is configured to face frontward and downward.

As illustrated in FIG. 6, the partition wall 6 has notch parts 61 and 62 for allowing the second and third ducts 7 and 9 to pass therethrough. Specifically, the first and second notch parts 61 and 62 are formed in the upper end part of the partition wall 6.

The first notch part 61 is formed in the upper end part and the left side end part (example of the first side end part) of the partition wall 6. The second duct body part 70 extends to cross between the engine compartment 2 and the cooling compartment 3 via the first notch part 61.

The second notch part 62 is formed in the upper end part and the right side end part (example of the second side end part) of the partition wall 6. The third duct 9 extends to cross between the engine compartment 2 and the cooling compartment 3 via the second notch part 62.

Figure 10:
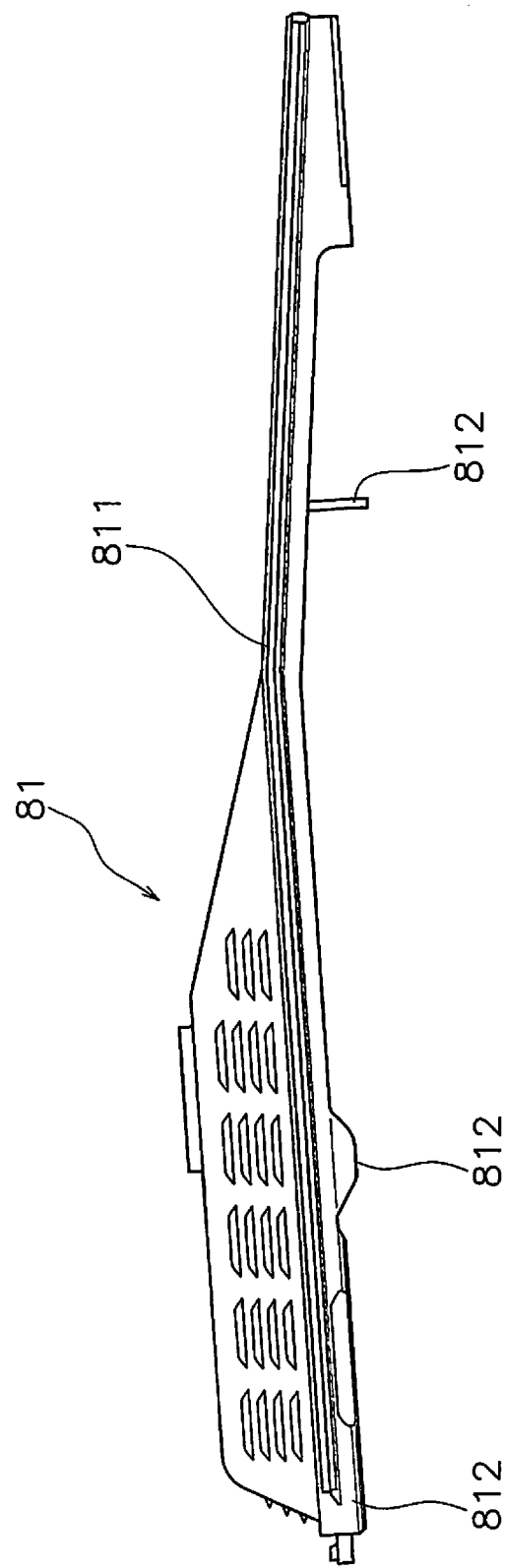
FIG. 10 is a side view of the top plate.

FIG. 10 is a side view of the top plate 81. As illustrated in FIG. 10, the top plate 81 has the top plate body part 811 and a plurality of leg parts 812. The top plate body part 811 is a portion that defines the upper surfaces of the engine compartment 2 and the cooling compartment 3. The leg parts 812 are portions that extend downward from the side edges of the top plate body part 811. A below mentioned lower end of the second duct body part 70 is positioned higher than a lower end of the leg part 812. As a result, when the top plate 81 is detached and placed on the ground, the leg parts 812 touch the ground and the second duct body part 70 does not touch the ground.

Characteristics

The wheel loader 100 according to exemplary embodiments of the present embodiment has the following characteristics.

When the cooling fan 5 is operating, negative pressure is produced in the cooling compartment 3 and the first duct 18 sucks in the air inside the engine compartment 2 from the first end part 181 and exhausts the air from the second end part 182 into the cooling compartment 3. As a result, outdoor air is sucked into the engine compartment 2 via the first outdoor air intake port 84 due to the negative pressure produced inside the engine compartment 2. The outdoor air sucked into the engine compartment 2 flows toward the front between the top plate 81 and the plate-like member 17 and then turns after passing over the front end of the plate-like member 17 and flows toward the rear. That is, the outdoor air passes through the gap 33 between the plate-like member 17 and the diesel particulate filtering device 121 and flows toward the first end part 181 of the first duct 18. The flow rate of the air flow increases because the gap 33 becomes gradually narrower. As a result, the connector 1211 disposed in the air flow can be cooled effectively.

MODIFIED EXAMPLES

While an exemplary embodiment of the present invention has been described above, the present invention is not limited to the exemplary embodiment and the following modifications may be made within the scope of the present invention.

While the connector 1211 is described as the cooling object member of the present invention in the above exemplary embodiment, the cooling object member of the present invention is not limited to the connector 1211 and may be any member so long as the member requires cooling.

The second end part 182, the fourth end part 72, and the sixth end part 92 of the above exemplary embodiment are not limited to being positioned in front of the radiator 4 and the cooling fan 5. For example, the second end part 182, the fourth end part 72, and the sixth end part 92 may be positioned to the rear of the radiator 4 and in front of the cooling fan 5. Specifically, the second, fourth and sixth end parts 182, 72 and 92 may be positioned between the radiator 4 and the cooling fan 5 in the front-back direction.

The cooling fan 5 in the above exemplary embodiment is not limited to rotating to exhaust the air inside the cooling compartment 3 to the rear. For example, the cooling fan 5 may rotate to suck in air into the cooling compartment 3 via the grille 31. The air inside the cooling compartment 3 is exhausted to the outside of the cooling compartment 3 through the third outdoor air intake port 87 and the like. In this case, the second end part 182 of the first duct 18 is preferably disposed to the rear of the cooling fan 5 inside the cooling compartment 3. For example, the second end part 182 is disposed between the cooling fan 5 and the grille 31.

While the diesel particulate filtering device 121 of the above exemplary embodiment is described as the first member of the present invention, the first member of the present invention is not limited to being the diesel particulate filtering device 121. For example, the selective catalyst reduction device 23 and the like may be disposed in the position of the diesel particulate filtering device 121 in the above exemplary embodiment. In this case, the selective catalyst reduction device 123 corresponds to the first member of the present invention. A diesel oxidation catalyst (DOC) may also be disposed in the position of the diesel particulate filtering device 121. In this case, the diesel oxidation catalyst corresponds to the first member of the present invention.

While the wheel loader 100 to which the present invention is applied has been described in the above exemplary embodiments, the present invention may be applicable to another work vehicle, such as a motor grader.

What is claimed is:

1. A work vehicle comprising:
an engine;
an engine compartment containing the engine;
a cooling compartment disposed to the rear of the engine compartment;
a partition wall partitioning the engine compartment from the cooling compartment;
a top plate having an outdoor air intake port and defining an upper surface of the engine compartment;
a plate-like member extending forward from the partition wall and disposed below the outdoor air intake port;
a first member disposed below the plate-like member inside the engine compartment;
a duct arranged to pass through the partition wall, the duct having a first end part positioned to the rear of the first member inside the engine compartment, and a second end part positioned inside the cooling compartment, the first end part opening inside the engine compartment and the second end part opening inside the cooling compartment;
a cooling fan configured to exhaust air from the cooling compartment and disposed inside the cooling compartment;
a cooling object member disposed in an air flow generated between the first end part and a gap between the first member and the plate-like member.

2. The work vehicle according to claim 1, wherein
the first member has a tubular shape.

3. The work vehicle according to claim 1, wherein
the first member extends in the vehicle width direction.

4. The work vehicle according to claim 1, further comprising
an exhaust gas post-processing device configured to process exhaust gas from the engine, wherein
the first member is a member that configures the exhaust gas post-processing device.

5. The work vehicle according to claim 1, wherein
the first end part opens toward the first member.

6. The work vehicle according to claim 1, wherein
the second end of the duct opens downwards.

7. The work vehicle according to claim 1, wherein
the first member is a diesel particulate filtering device.

8. The work vehicle according to claim 1, wherein
the first member is a diesel oxidation catalyst.

9. The work vehicle according to claim 1, wherein
a center position of the first end part in the vertical direction is positioned higher than a center axis of the first member.

10. The work vehicle according to claim 1, wherein
the top plate has a first sloping part sloping downward toward the rear; and
the outdoor air intake port is formed in the first sloping part.

11. The work vehicle according to claim 1, wherein
the plate-like member slopes downward toward the rear.

12. The work vehicle according to claim 3, further comprising
an exhaust gas post-processing device configured to process exhaust gas from the engine, wherein
the first member is a member that configures the exhaust gas post-processing device.

13. The work vehicle according to claim 12, wherein
the first end part opens toward the first member.

14. The work vehicle according to claim 13, wherein
the second end of the duct opens downwards.

15. The work vehicle according to claim 14, wherein
the first member is a diesel particulate filtering device.

16. The work vehicle according to claim 14, wherein
the first member is a diesel oxidation catalyst.

17. A work vehicle comprising:
an engine;
an engine compartment containing the engine;
a cooling compartment disposed to the rear of the engine compartment;
a partition wall partitioning the engine compartment from the cooling compartment;
a top plate having an outdoor air intake port and defining an upper surface of the engine compartment;
a plate-like member extending forward from the partition wall and disposed below the outdoor air intake port;
a first member configured to be an exhaust gas post-processing device for processing exhaust gas from the engine, the first member being disposed below the plate-like member inside the engine compartment, the first member extending in a vehicle width direction;
a duct having a first end part positioned to the rear of the first member inside the engine compartment, and a second end part positioned inside the cooling compartment, the first end part opening toward the first member and the second end part opening downward;

a cooling fan configured to exhaust air from the cooling compartment and disposed inside the cooling compartment; and a cooling object member disposed in an air flow generated between the first end part and a gap between the first member and the plate-like member, a center position of the first end part in the vertical direction being positioned higher than a center axis of the first member.

18. The work vehicle according to claim 17, wherein
the top plate has a first sloping part sloping downward toward the rear; and
the outdoor air intake port is formed in the first sloping part.

19. The work vehicle according to claim 18, wherein
the plate-like member slopes downward toward the rear.

20. A work vehicle comprising:
an engine;
an engine compartment containing the engine;
a cooling compartment disposed to rearward of the engine compartment in a longitudinal direction of the work vehicle;
a partition wall partitioning the engine compartment from the cooling compartment;
a top plate having an outdoor air intake port and defining an upper surface of the engine compartment;
a plate-like member disposed inside the engine compartment below the top plate, the plate-like member extending below the outdoor air intake port and beyond the outdoor air intake port in forward and rearward directions of the work vehicle;
a first member disposed below the plate-like member inside the engine compartment;
a duct having a first end part positioned to the rear of the first member inside the engine compartment, and a second end part positioned inside the cooling compartment;
a cooling fan configured to exhaust air from the cooling compartment and disposed inside the cooling compartment;
a cooling object member disposed in an air flow generated between the first end part and a gap between the first member and the plate-like member.

21. The work vehicle according to claim 20, wherein
the top plate and the plate-like member are configured and arranged to diverge from each other in a vertical direction as a forward end of the plate-like member is approached from a rearward end of the plate-like member.

* * * * *